United States Patent
Meyers

(10) Patent No.: US 9,751,472 B2
(45) Date of Patent: Sep. 5, 2017

(54) TOOL RACK ATTACHMENT

(71) Applicant: Diversified Products, LLC, Omaha, NE (US)

(72) Inventor: Chris Meyers, Omaha, NE (US)

(73) Assignee: Diversified Products, LLC, Omaha, NE (US)

( * ) Notice: Subject to any disclaimer, the term of this patent is extended or adjusted under 35 U.S.C. 154(b) by 79 days.

(21) Appl. No.: 14/208,209

(22) Filed: Mar. 13, 2014

(65) Prior Publication Data

US 2014/0263505 A1 Sep. 18, 2014

Related U.S. Application Data

(60) Provisional application No. 61/783,391, filed on Mar. 14, 2013.

(51) Int. Cl.
*B60R 9/06* (2006.01)
*B60R 11/06* (2006.01)
*F04B 17/06* (2006.01)

(52) U.S. Cl.
CPC ............... *B60R 11/06* (2013.01); *B60R 9/06* (2013.01); *F04B 17/06* (2013.01); *Y10T 137/0396* (2015.04); *Y10T 137/85986* (2015.04)

(58) Field of Classification Search
CPC .................................. B60R 11/06; B60R 9/06
USPC ........................... 37/403, 468; 224/400, 401
See application file for complete search history.

(56) References Cited

U.S. PATENT DOCUMENTS

| | | | |
|---|---|---|---|
| 3,672,521 A * | 6/1972 | Bauer | E02F 3/3622 414/723 |
| 4,132,132 A | 1/1979 | Shaffer | |
| 4,213,592 A * | 7/1980 | Lingenfelser | A62C 13/78 248/313 |
| 4,245,807 A * | 1/1981 | York | A01K 7/00 248/310 |
| 4,920,631 A | 5/1990 | Novak | |
| 4,949,805 A | 8/1990 | Mather et al. | |
| 5,056,615 A | 10/1991 | Duthie et al. | |
| 5,174,115 A | 12/1992 | Jacobson et al. | |
| 5,460,304 A * | 10/1995 | Porter | B60R 9/06 224/485 |
| 5,590,731 A | 1/1997 | Jacobson | |
| 5,711,391 A | 1/1998 | Brandt et al. | |
| 6,202,014 B1 | 3/2001 | Brandt et al. | |
| 6,439,517 B1 * | 8/2002 | Applegate | B65F 1/141 248/154 |
| 6,659,709 B1 | 12/2003 | Anderson | |
| 6,820,781 B1 * | 11/2004 | Gardner | B60R 9/00 224/401 |
| 6,923,285 B1 | 8/2005 | Rossow et al. | |
| 7,509,758 B2 * | 3/2009 | Nesseth | E02F 3/3668 172/272 |

(Continued)

*Primary Examiner* — Adam Waggenspack
(74) *Attorney, Agent, or Firm* — Suiter Swantz pc llo

(57) ABSTRACT

The present disclosure is directed to a tool rack attachment configured for holding at least one tool. The tool rack attachment may be configured for attachment to a vehicle. The tool rack attachment may include a frame and a coupling mechanism. The coupling mechanism may be configured for releasable attachment to the vehicle. The tool rack attachment may also include at least one bracket. The bracket may be configured to retain the tool. The tool rack attachment may provide convenient access, storage, and transport to one or more tools.

6 Claims, 6 Drawing Sheets

(56) References Cited

U.S. PATENT DOCUMENTS

| | | | |
|---|---|---|---|
| 7,641,018 B2 | 1/2010 | Bissontz | |
| 7,806,308 B2* | 10/2010 | Gunn | B60R 9/06 |
| | | | 224/512 |
| 8,621,855 B2 | 1/2014 | Meyeres et al. | |
| 8,862,274 B2 | 10/2014 | Reiter et al. | |
| 9,063,530 B2 | 6/2015 | Lougheed et al. | |
| 9,080,319 B2 | 7/2015 | Oates, Jr. et al. | |
| 2003/0037984 A1* | 2/2003 | McPherson | B62D 21/00 |
| | | | 180/311 |
| 2003/0136568 A1 | 7/2003 | McReynolds et al. | |
| 2006/0120848 A1 | 6/2006 | Guhr | |
| 2008/0152469 A1* | 6/2008 | Bates | B66F 9/12 |
| | | | 414/557 |
| 2008/0223026 A1 | 9/2008 | Schuh et al. | |
| 2009/0078488 A1 | 3/2009 | Bock et al. | |
| 2009/0140574 A1 | 6/2009 | Gorman et al. | |
| 2010/0025405 A1* | 2/2010 | Slack | B60R 9/00 |
| | | | 220/500 |
| 2011/0271562 A1* | 11/2011 | Nesseth | E02F 3/345 |
| | | | 37/403 |
| 2012/0035815 A1 | 2/2012 | Kawashima et al. | |
| 2013/0213920 A1* | 8/2013 | Oliver | B66C 23/62 |
| | | | 212/302 |

\* cited by examiner

TOOL RACK ATTACHMENT

PRIORITY

The present application claims the benefit under 35 U.S.C. §119(e) of U.S. Provisional Application Ser. No. 61/783,391, filed Mar. 14, 2013, which is incorporated herein by reference.

CROSS REFERENCE TO RELATED APPLICATIONS

This application is related to co-pending and concurrently filed U.S. patent application Ser. No. 14/208,109, entitled "AUXILIARY MOBILE POWER UNIT" which is incorporated herein by reference.

TECHNICAL FIELD

The present disclosure generally relates to the field of machinery and more particularly to a tool rack attachment for connection to a vehicle.

BACKGROUND

Vehicle operators may need to use various tools while operating different vehicle types, or while working near the vehicle. Storage, transport and access for the tools can be a problem.

Therefore, there exists a need for improved systems and methods for providing storage, transport, and access to tools when operating a vehicle or working near the vehicle.

SUMMARY

The present disclosure is directed to a tool rack attachment configured for holding at least one tool. The tool rack attachment may be configured for attachment to a vehicle. The tool rack attachment may include a frame and a coupling mechanism connected to the frame. The coupling mechanism may be configured for releasable attachment to the vehicle. The tool rack attachment may also include at least one bracket connected to the frame. The bracket may include a clamp configured to open and close. The bracket may be configured to retain the tool when the clamp is closed and to release the tool when the clamp is open. The tool rack attachment may provide convenient access, storage, and transport to one or more tools.

The present disclosure is also directed to a tool rack attachment configured for holding a plurality of tools. The tool rack attachment may be configured for attachment to a vehicle. The tool rack attachment may include a frame and a coupling mechanism connected to the frame. The coupling mechanism may be configured for releasable attachment to the vehicle. The tool rack attachment may also include a first bracket mounted to the frame. The first bracket may include a clamp configured to open and close and may be configured to retain a first tool when the clamp is closed, and to release the first tool when the clamp is open. The tool rack attachment may also include a second bracket mounted to the frame. The second bracket may include a clamp configured to open and close and may be configured to retain a second tool when the clamp is closed and to release the second tool when the clamp is open.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

The present disclosure incorporates modular storage configuration with a wide range of coupler compatibility to offer a variety of tool storage solutions for mobile hydraulic equipment.

Figure 1:
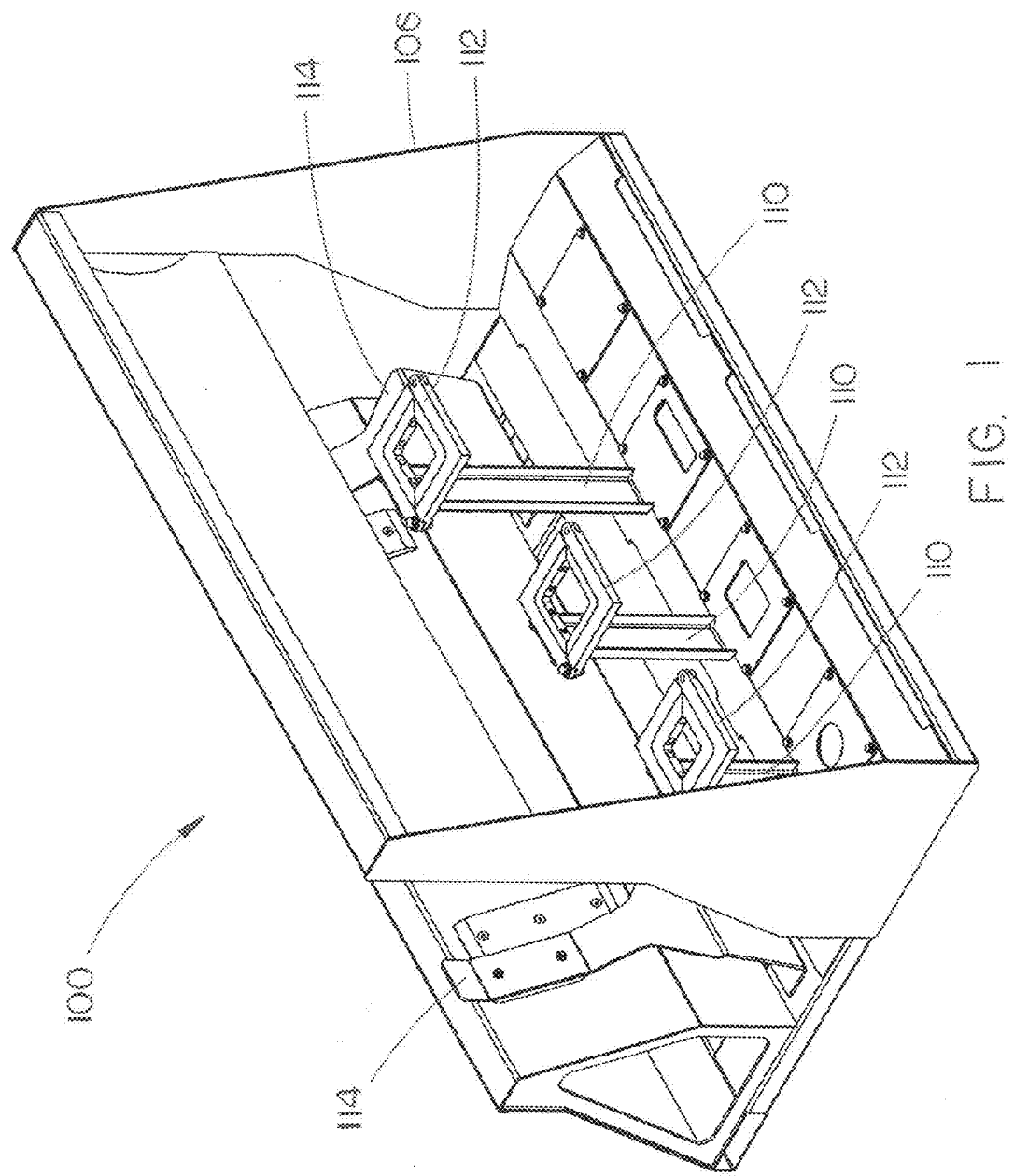
FIG. 1 shows a view of a tool rack attachment including a plurality of brackets.
Figure 2:
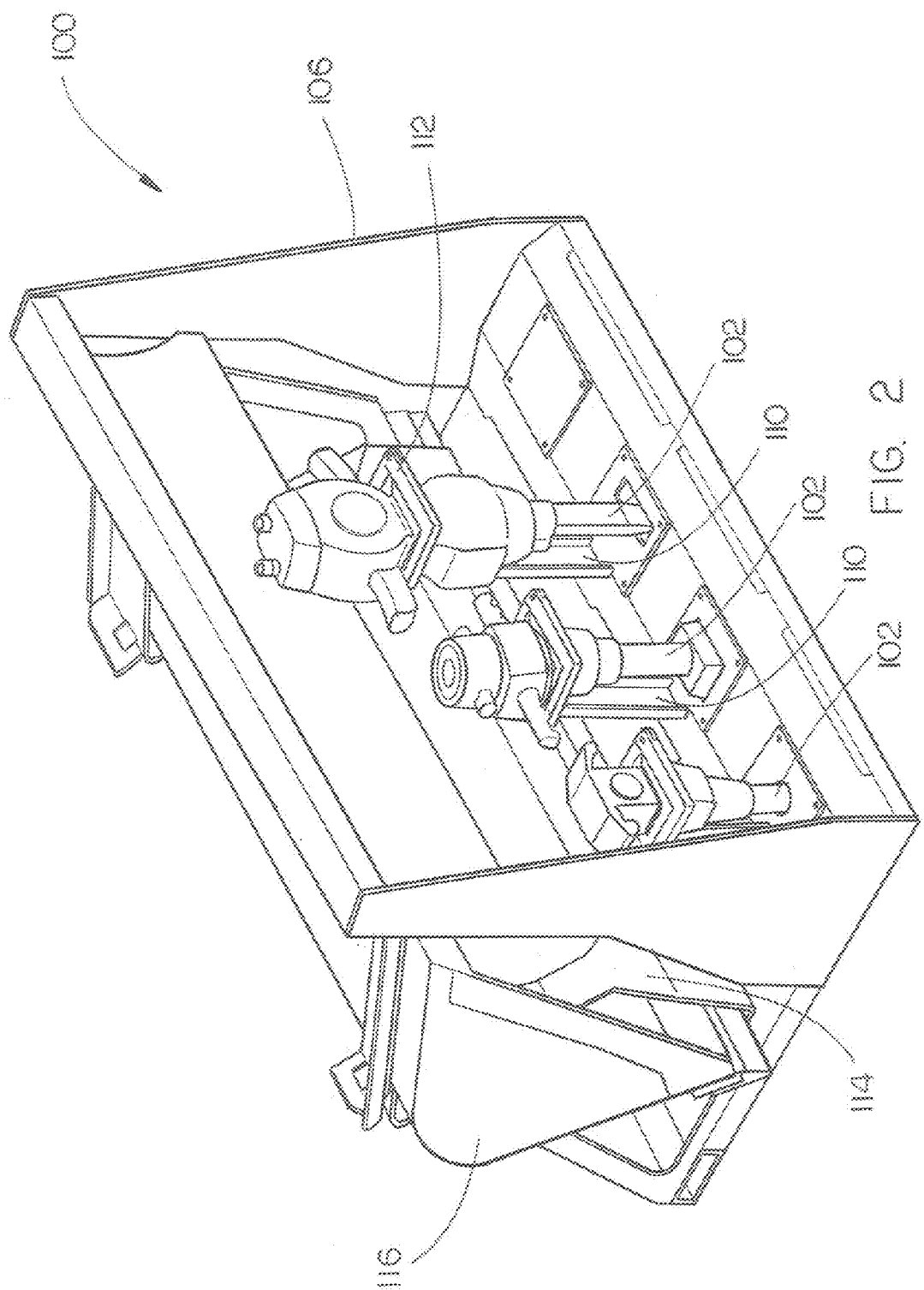
FIG. 2 shows a view of a tool rack attachment including a plurality of brackets holding a plurality of tools.
Figure 3:
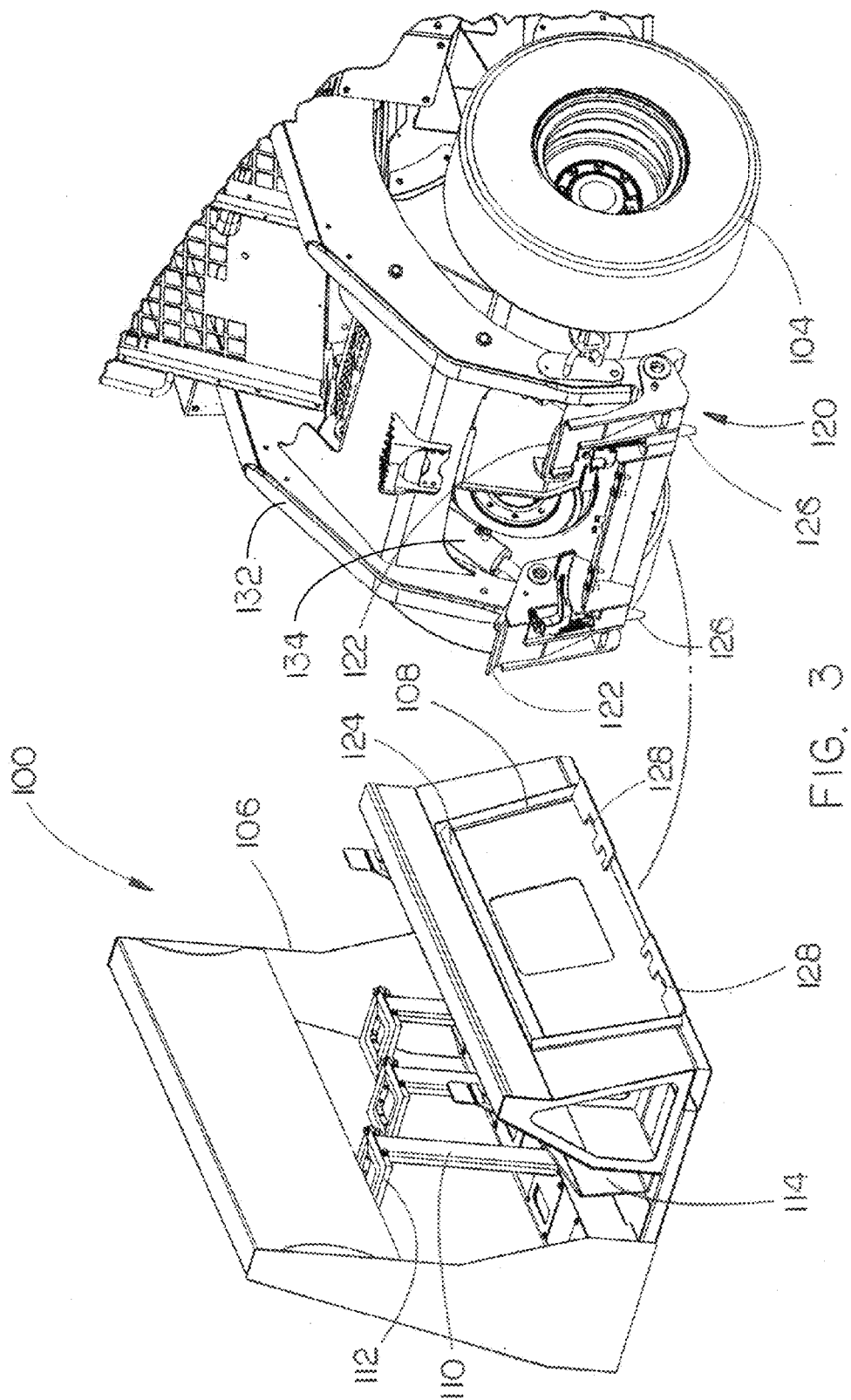
FIG. 3 shows a view of a side of the tool rack attachment including a coupling mechanism and a corresponding coupling mechanism on a skid steer loader.

Referring generally to FIGS. 1-4, a tool rack attachment 100 configured for holding at least one tool 102 is provided. Referring to FIG. 3, the tool rack attachment 100 may be configured for attachment to a vehicle 104. The tool rack attachment 100 may include a frame 106 and a coupling mechanism 108. The coupling mechanism 108 may be connected to the frame 106. The coupling mechanism 108 may be configured for releasable attachment to the vehicle 104. The tool rack attachment 100 may also include at least one bracket 110 connected to the frame 106. The bracket 110 may include a clamp 112 configured to open and close. The bracket 110 may be configured to retain the tool 102 when the clamp 112 is closed and to release the tool 102 when the clamp 112 is open. The tool rack attachment 100 may provide convenient access, storage, and transport to one or more tools 102.

Figure 4:
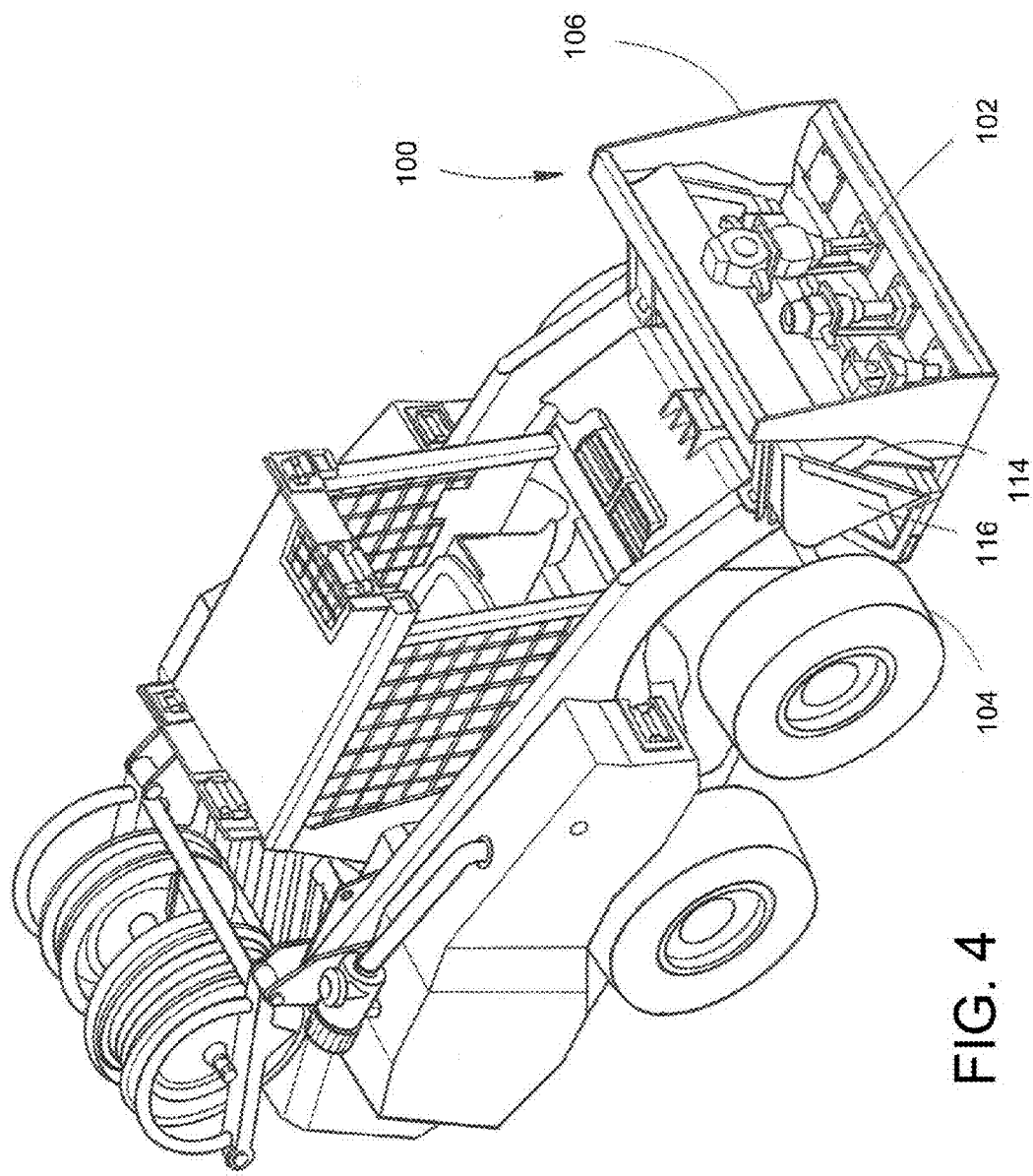
FIG. 4 is a view of the tool rack attachment holding a plurality of tools while coupled to a skid steer loader.

The coupling mechanism 108 of the tool rack attachment 100 shown in FIGS. 1-4 may be configured for connection with a quick-change coupler system 118 of a vehicle 104 in one embodiment. Referring to FIG. 3, the coupling mechanism 108 may include a manual type coupler, a semi-automatic type coupler, or an automatic coupler. The use of a quick-change coupler system may be advantageous by providing compatibility between the tool rack attachment 100 and a variety of vehicle 104 and machine types configured for use with the quick-change coupler system 120. The quick-change coupler system 120 of the vehicle 104 may include one or more projection portions 122. The projection portions of the quick-change coupler system 120 may be configured to be placed under a flanged portion 124 of the coupling mechanism 108. The quick-change coupler system 118 may further include one or more actuatable members 126 that, upon actuation, may be disposed within one or more apertures 128 of the coupling mechanism 108 so as to link the quick-change coupler system 120 to the coupling mechanism 108 allowing for transport of the tool rack attachment 100 by the vehicle 104 as shown in FIG. 4.

The tool rack attachment 100 may also include at least one bracket 110 connected to the frame 106. In the embodiment shown in FIGS. 1-4, the tool rack attachment 100 includes three brackets 110. The number of, size, and placement of the brackets 110 may vary depending on the type of tools 102 that the tool rack attachment 100 is storing or transporting, as well as the vehicle 104 used for transport, and user preferences. The brackets 110 may all be identical in one embodiment. In another embodiment, the size and configuration of each bracket 110 on the tool rack attachment 100 may vary. In the embodiments shown in FIGS. 1-4, the three brackets 110 may have different sizes in order to accommodate different tool 102 types.

Figure 5:
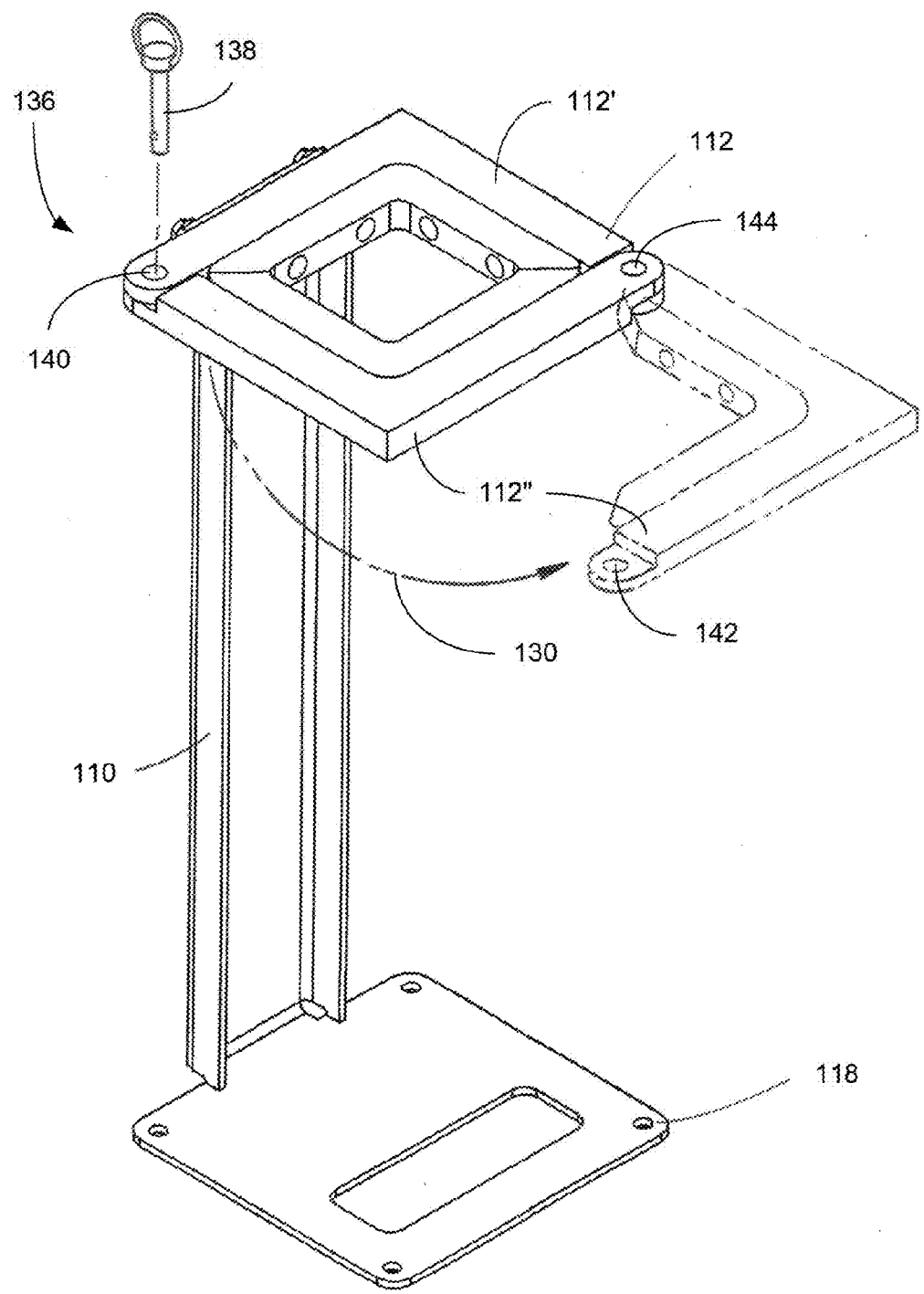
FIG. 5 is a view of a bracket of the tool rack attachment.

A bracket 110 may include a clamp 112 configured to open and close in order to hold the tool in the tool rack attachment 100 while allowing easy access to and removal of the tool 102. The clamp 112 may include a first at least partially angled portion 112' and a second at least partially angled portion 112" substantially horizontally rotatable 130 about a coupling 144 to the first at least partially angled portion 112'. The bracket may further include a locking mechanism 136 (e.g. a locking pin 138 configured to be inserted into cooperating apertures 140 and 142 of the first at least partially angled portion 112' and the second at least partially angled portion 112", respectively) to releasably couple the first at least partially angled portion 112' and the second at least partially angled portion 112" to one another. The bracket 110 may be configured to retain the tool 102, for example by retaining the tool 102 when the clamp 112 is closed and releasing the tool 102 when the clamp 112 is open. FIG. 5 shows an example of the clamp 112 opening and closing. The example shown in FIG. 5 is merely exemplary and any suitable mechanism that may allow holding and on demand release/access to the tool 102 may be used. In addition, the size and placement of the clamp 112 may vary depending on the type of tool 102 and the configuration of the bracket 110.

A bracket 110 may mount to the frame 106 via a mounting mechanism 118, as shown in FIG. 5. The mounting mechanism 118 may include hardware used to attach the bracket 110 securely to the frame 106. In one embodiment, the mounting mechanism 118 for each bracket 110 may be the same, even if the size or configuration of the brackets 110 is different. This may provide the advantage of flexibility in configuring and reconfiguring the tool rack attachment 100.

Figure 6:
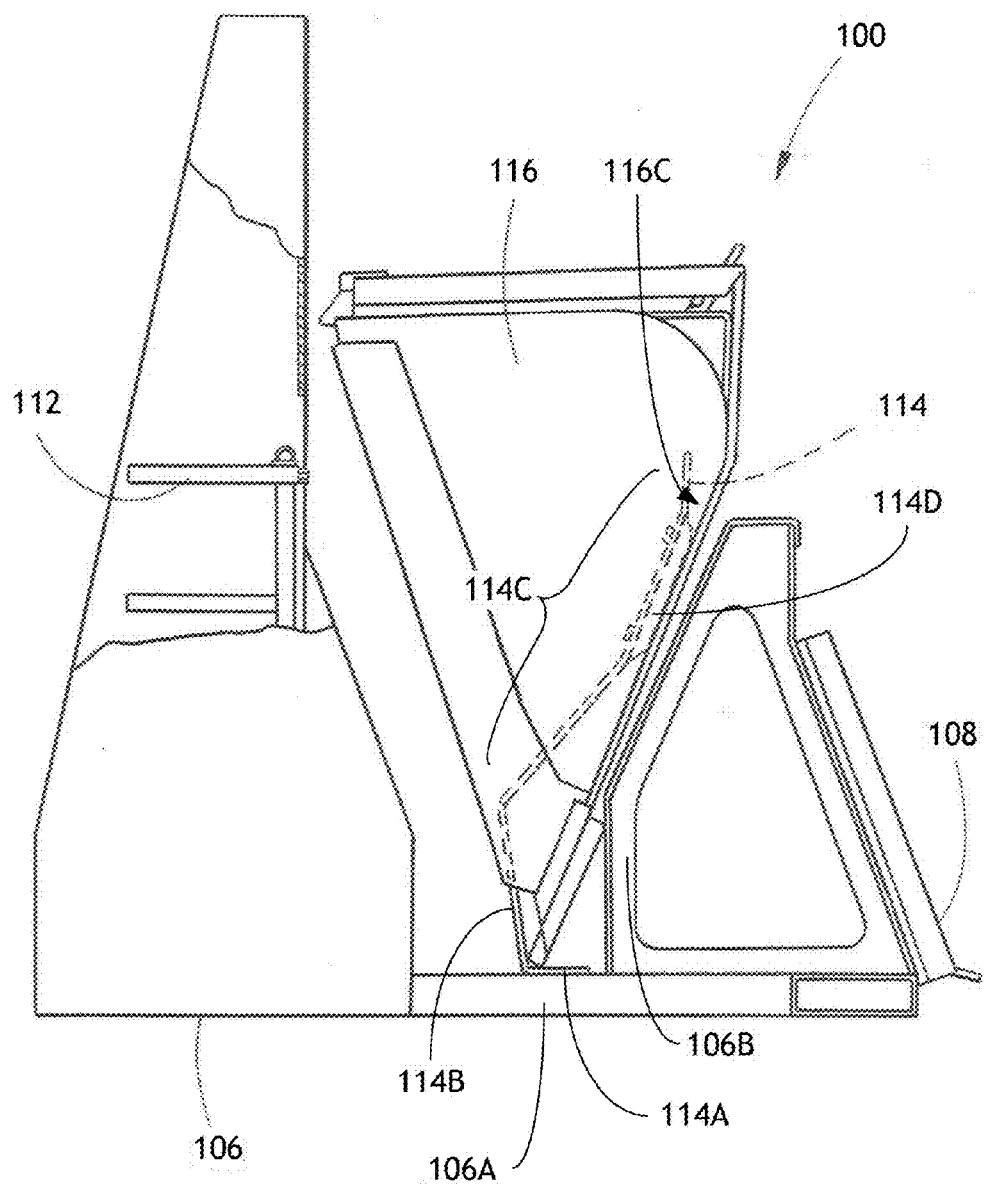
FIG. 6 is a side view of the tool rack attachment while storing a bucket.

The tool rack attachment 100 may further include one or more bucket guides 114 in one embodiment, as shown in FIGS. 1, 2 and 6. As shown in FIG. 2, the bucket guides 114 may be configured to receive a bucket 116 into the tool rack attachment 100. The tool rack attachment 100 may receive the bucket 116 and hold it securely during storage and transport. The view provided in FIG. 6 is a side view of how the bucket guides 114 may be used to secure the bucket 116 when it is received by the tool rack attachment 100. This may be advantageous by allowing an operator to transport the bucket 116 as well as one or more tools 102 in a single trip. For example, as shown in FIG. 6, a bucket guide 114 may include a first flanged portion 114A coupled to a base portion 106A of the frame 106. The bucket guide 114 may further include a second extension portion 114B extending at an angle relative to the base portion 106. The bucket guide may further include a third bucket contacting portion 114C including a bucket contact pad 114D.

The tool rack attachment 100 shown in FIGS. 1-4 may be configured to provide access to one or more tools 102 when the tool rack attachment 100 is not connected to the vehicle 104. The tool rack attachment 100 may be configured to be free-standing, which may provide continued access to stored tools once the tool rack attachment 100 has been un-coupled from the vehicle 104.

The tool rack attachment 100 may also be configured to provide convenient access to the tools 102 when the tool rack attachment 100 is coupled to the vehicle 104. This may be accomplished by configuring the tool rack attachment 100 such that the coupling mechanism 108 is located on a first side of the frame 106 and the one or more brackets 110 are located on a second side of the frame 106. The result is that the second side of the frame having the brackets 110 and tools 102 is generally facing away from a connection point of the vehicle.

The tool rack attachment 100 may be used with any suitable vehicle 104 or machine, including a manually actuated vehicle or a hydraulic actuated vehicle or machine. In one embodiment, the tool rack attachment 100 is used with a skid steer loader. In another embodiment, the tool rack attachment 100 may be used with other machinery, such as an excavator, backhoe, paver, tractor, dozer, or the like.

The tool rack attachment 100 may be used to transport and store a variety of tools 102, such as a breaker, a driver, a puller, a wrench, a drill, a cutting tool, a saw, a hammer, a compactor, a grapple, a jackhammer, a rock breaker, or the like. The tools 102 may include handheld, compact tools in one embodiment, or larger tools in another embodiment.

The tool rack attachment 100 may be useful for storing and transporting tools when using an on board auxiliary mobile power system to supply power to one or more of the tools 102. For example, when the vehicle 104 includes an auxiliary mobile power system, the tool rack attachment 100 may be coupled to the vehicle 104 in order to hold one or more tools 102 that will be receiving power from the mobile auxiliary power system. This may provide the advantage of allowing the vehicle 104 to transport the tools 102 to a desired location, where a first tool 102 may then be powered by the auxiliary mobile power system and a second tool 102 may be stored on the tool rack attachment 100 until needed. Details relating to the mobile auxiliary power system are described in related U.S. patent application No. (to be assigned) entitled "Auxiliary Mobile Power System".

The tool rack attachment 100 described in the present disclosure may provide several advantages. For example, the tool rack attachment 100 may include a universal coupler design to provide compatibility with a wide range of machine types utilizing a quick-change coupler system. In addition, the tool rack attachment 100 offers a modular storage configuration which utilizes unique brackets 110 and clamps 112 specific for each tool 102. Although the tool rack attachment can accommodate different brackets 110 and clamps 112 for different tool 102 types, the mounting for each bracket 110 to the frame 106 of the tool rack attachment 100 may use the same footprint and mounting hardware to maximize flexibility. The tool rack attachment 100 also includes brackets 110 which provide positive tool 102 retention but allow for easy access and quick release.

The tool rack attachment 100 incorporates convenient storage and retrieval of common work tools 102. Common attachment storage may be conveniently located to minimize machine travel when retrieving the work tool from the attachment. In addition, the tool rack attachment 100 may be free-standing, which may provide continued access to stored tools 102 once it has been un-coupled from the vehicle 104.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A tool transport system comprising:
    a vehicle including:
        a coupling system including one or more actuatable members, and
    a tool rack attachment including:
        a frame having a bucket support portion for supporting a bucket;
        a coupling mechanism including:
            a first flanged portion extending from the frame and including an outwardly extending portion and an at least partly downwardly extending portion configured to physically engage at least a portion of the coupling system, and
            a second flanged portion extending outwardly from the frame, the second flanged portion including one or more apertures configured to receive the one or more actuatable members of the coupling system; and
        a bracket configured to retain at least one tool, the bracket including:
            at least a first clamp portion secured to the frame;
            at least a second clamp portion having a first end rotatably coupled to a first end of the first clamp portion; and
            a locking mechanism configured to releasably couple a second end of the first clamp portion to a second end of the second clamp portion; and
        at least one bucket guide operably coupled to the frame and configured to secure a bucket, the at least one bucket guide including:
            a first portion extending along and coupled to the frame for coupling the bucket guide thereto;
            a second extension portion extending from the first portion at an angle; and
            a bucket contact portion extending at least partially upwardly from the end of the second extension portion opposite the first portion and configured to contact an interior surface of the bucket when the bucket is supported by the bucket support portion of the frame.

2. The tool transport system as claimed in claim 1, wherein the at least one portion of the vehicle engaging the coupling mechanism includes:
    one or more projection portions configured to be placed under the first flanged portion of the coupling mechanism.

3. The tool transport system as claimed in claim 1, further comprising:
    a second bracket configured to retain a second tool.

4. The tool transport system as claimed in claim 1, wherein the vehicle is a skid steer loader.

5. The tool transport system as claimed in claim 1,
    wherein the first clamp portion includes a first at least partially angled portion; and
    wherein the second clamp portion includes a second at least partially angled portion.

6. The tool transport system as claimed in claim 1, wherein the at least a second clamp portion having a first end rotatably coupled to a first end of the first clamp portion includes:
    at least a second clamp portion having a first end rotatably coupled to a first end of the first clamp portion such that the second clamp portion rotates substantially horizontally.

* * * * *